(12) United States Patent
Campbell et al.

(10) Patent No.: US 12,001,883 B2
(45) Date of Patent: *Jun. 4, 2024

(54) DYNAMIC RESOURCE ALLOCATION FOR COMPUTATIONAL SIMULATION

(71) Applicant: OnScale, Inc., Redwood City, CA (US)

(72) Inventors: Ian Campbell, San Jose, CA (US); Ryan Diestelhorst, Atlanta, GA (US); Joshua Oster-Morris, Atlanta, GA (US); David M. Freed, Burlingame, CA (US); Scott McClennan, Sunnyvale, CA (US)

(73) Assignee: OnScale, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,321

(22) Filed: Jun. 9, 2023

(65) Prior Publication Data

US 2023/0393895 A1 Dec. 7, 2023

Related U.S. Application Data

(63) Continuation of application No. 17/557,488, filed on Dec. 21, 2021, now Pat. No. 11,714,680, which is a
(Continued)

(51) Int. Cl.
*G06F 9/50* (2006.01)
*G06F 30/20* (2020.01)
(Continued)

(52) U.S. Cl.
CPC ............... *G06F 9/50* (2013.01); *G06F 30/20* (2020.01); *G06F 30/23* (2020.01); *G06F 2111/10* (2020.01); *G06F 2209/505* (2013.01)

(58) Field of Classification Search
None
See application file for complete search history.

(56) References Cited

U.S. PATENT DOCUMENTS 11,055,454 B1 7/2021 Gasser et al.
2003/0182597 A1 9/2003 Coha et al.
(Continued)

FOREIGN PATENT DOCUMENTS

CN 104679591 A 6/2015
CN 107784152 A 3/2018
(Continued)

OTHER PUBLICATIONS

Extended European Search Report, dated Feb. 25, 2022, received in connection with EP Patent Application No. 21197818.4.
(Continued)

*Primary Examiner* — Craig C Dorais
(74) *Attorney, Agent, or Firm* — Meunier Carlin & Curfman LLC

(57) ABSTRACT

Systems and methods for automated resource allocation during a computational simulation are described herein. An example method includes analyzing a set of simulation inputs to determine a first set of computing resources for performing a simulation, and starting the simulation with the first set of computing resources. The method also includes dynamically analyzing at least one attribute of the simulation to determine a second set of computing resources for performing the simulation, and performing the simulation with the second set of computing resources. The second set of computing resources is different than the first set of computing resources.

20 Claims, 8 Drawing Sheets

Related U.S. Application Data continuation of application No. 17/030,991, filed on Sep. 24, 2020, now Pat. No. 11,210,138.

(51) Int. Cl.
    *G06F 30/23*     (2020.01)
    *G06F 111/10*     (2020.01)

(56) References Cited

U.S. PATENT DOCUMENTS

| | | |
|---|---|---|
| 2012/0035895 A1 | 2/2012 | Gadhamsetty et al. |
| 2012/0123764 A1 | 5/2012 | Ito et al. |
| 2013/0116988 A1 | 5/2013 | Zhang et al. |
| 2015/0143367 A1 | 5/2015 | Jia et al. |
| 2018/0060456 A1 | 3/2018 | Phatak et al. |
| 2019/0347372 A1 | 11/2019 | Ebstyne et al. |
| 2020/0342148 A1 | 10/2020 | Banks et al. |
| 2021/0133378 A1 | 5/2021 | Kosic et al. |

FOREIGN PATENT DOCUMENTS

| | | |
|---|---|---|
| EP | 3287901 A1 | 2/2018 |
| WO | 2019203822 A1 | 10/2019 |

OTHER PUBLICATIONS

Office Action issued in corresponding CN Patent App. No. 202111114210.X, mailed Mar. 2, 2024 (with English-language translation), 16 pages.

DYNAMIC RESOURCE ALLOCATION FOR COMPUTATIONAL SIMULATION

CROSS-REFERENCE TO RELATED APPLICATIONS

This application is a continuation of U.S. patent application Ser. No. 17/557,488, filed on Dec. 21, 2021, which is a continuation of U.S. patent application Ser. No. 17/030,991, filed on Sep. 24, 2020 (now U.S. Pat. No. 11,210,138), and titled "DYNAMIC RESOURCE ALLOCATION FOR COMPUTATIONAL SIMULATION," the disclosures of which are expressly incorporated herein by reference in their entireties.

BACKGROUND

Computer-aided engineering (CAE) is the practice of simulating representations of physical objects using computational methods including, but not limited to, finite element method (FEM) and finite difference method (FDM). To perform simulations using FEM and/or FDM, the domain must be discretized into a finite number of elements called a mesh. FEM and FDM are techniques for converting differential equations (e.g., partial differential equations (PDEs)) into a system of equations that can be solved numerically.

SUMMARY

An example computer-implemented method for automated resource allocation during a computational simulation is described herein. The method includes analyzing a set of simulation inputs to determine a first set of computing resources for performing a simulation, and starting the simulation with the first set of computing resources. The method also includes dynamically analyzing at least one attribute of the simulation to determine a second set of computing resources for performing the simulation, and performing the simulation with the second set of computing resources. The second set of computing resources is different than the first set of computing resources.

Additionally, in some implementations, the step of dynamically analyzing the at least one attribute of the simulation further determines that the simulation requires more computing resources than included in the first set of computing resources.

Alternatively or additionally, the set of simulation inputs includes at least one of a geometry representation, a material property, a boundary condition, a loading condition, a mesh parameter, a solver option, a simulation output request, or a time parameter.

Alternatively or additionally, the at least one attribute of the simulation is a simulation requirement, a simulation performance characteristic, or a compute capacity indicator. The compute capacity indicator includes at least one of a usage level of computing capacity, a memory bandwidth, a network bandwidth, or a network latency.

Optionally, in some implementations, respective simulation inputs for each of a plurality of simulations are analyzed.

In some implementations, the step of performing the simulation with the second set of computing resources includes automatically restarting the simulation with the second set of computing resources. Alternatively, the step of performing the simulation with the second set of computing resources includes automatically continuing the simulation with the second set of computing resources.

Alternatively or additionally, in some implementations, the method optionally includes adaptively refining a mesh during the simulation. The adaptive refinement of the mesh includes changing a mesh density and/or an order of mesh elements.

Alternatively or additionally, in some implementations, the set of simulation inputs is analyzed to determine the first set of computing resources for performing the simulation while achieving a target value for a simulation metric. Alternatively or additionally, in some implementations, the at least one attribute of the simulation is dynamically analyzed to determine the second set of computing resources for performing the simulation while achieving a target value for a simulation metric. The simulation metric is core hour cost, a memory requirement, simulation run time, efficiency of hardware configuration, or energy cost. Additionally, the target value for the simulation metric is an optimal value for the simulation metric.

Alternatively or additionally, each of the first and second sets of computing resources includes at least one of a number of cores, an amount of memory, a number of virtual machines, or a hardware configuration.

Alternatively or additionally, in some implementations, the method optionally includes transferring a state of the simulation from the first set of computing resources to the second set of computing resources. The state of the simulation includes at least one of mesh information, constraint and loading conditions, derived quantities, factorized matrices, primary solution and secondary field variables, history variables, or stored results.

Alternatively or additionally, in some implementations, the at least one attribute of the simulation is periodically analyzed to determine the second set of computing resources for performing the simulation.

Alternatively or additionally, the simulation is represented by a set of equations. Optionally, the set of equations represents partial differential equations (PDEs).

Alternatively or additionally, in some implementations, the dynamic analysis optionally includes comparing the at least one attribute of the simulation to a threshold.

Alternatively or additionally, in some implementations, the first and second sets of computing resources are part of a computing cluster.

An example system for automated resource allocation during a computational simulation is described herein. The system includes a computing cluster, and a resource allocator operably coupled to the computing cluster. The resource allocator includes a processor and a memory operably coupled to the processor, where the memory has computer-executable instructions stored thereon. The resource allocator is configured to analyze a set of simulation inputs to determine a first set of computing resources in the computing cluster for performing a simulation. The first set of computing resources is configured to start the simulation. Additionally, the resource allocator is configured to dynamically analyze at least one attribute of the simulation to determine a second set of computing resources in the computing cluster for performing the simulation. The second set of computing resources is configured to perform the simulation. The second set of computing resources is different than the first set of computing resources.

Additionally, in some implementations, the step of dynamically analyzing the at least one attribute of the simulation further determines that the simulation requires more computing resources than included in the first set of computing resources.

Alternatively or additionally, the set of simulation inputs includes at least one of a geometry representation, a material property, a boundary condition, a loading condition, a mesh parameter, a solver option, a simulation output request, or a time parameter.

Alternatively or additionally, the at least one attribute of the simulation is a simulation requirement, a simulation performance characteristic, or compute capacity indicator. The compute capacity indicator includes at least one of a usage level of computing capacity, a memory bandwidth, a network bandwidth, or a network latency.

Optionally, in some implementations, respective simulation inputs for each of a plurality of simulations are analyzed.

In some implementations, the step of performing the simulation with the second set of computing resources includes automatically restarting the simulation with the second set of computing resources. Alternatively, the step of performing the simulation with the second set of computing resources includes automatically continuing the simulation with the second set of computing resources.

Alternatively or additionally, in some implementations, the resource allocator is optionally configured to adaptively refine a mesh during the simulation. The adaptive refinement of the mesh includes changing a mesh density and/or an order of mesh elements.

Alternatively or additionally, in some implementations, the set of simulation inputs is analyzed to determine the first set of computing resources for performing the simulation while achieving a target value for a simulation metric. Alternatively or additionally, in some implementations, the at least one attribute of the simulation is dynamically analyzed to determine the second set of computing resources for performing the simulation while achieving a target value for a simulation metric. The simulation metric is core hour cost, a memory requirement, simulation run time, efficiency of hardware configuration, or energy cost. Additionally, the target value for the simulation metric is an optimal value for the simulation metric.

Alternatively or additionally, each of the first and second sets of computing resources includes at least one of a number of cores, an amount of memory, a number of virtual machines, or a hardware configuration.

Alternatively or additionally, in some implementations, the resource allocator is optionally configured to transfer a state of the simulation from the first set of computing resources to the second set of computing resources. The state of the simulation includes at least one of mesh information, constraint and loading conditions, derived quantities, factorized matrices, primary solution and secondary field variables, history variables, or stored results.

Alternatively or additionally, in some implementations, the at least one attribute of the simulation is periodically analyzed to determine the second set of computing resources for performing the simulation.

Alternatively or additionally, the simulation is represented by a set of equations. Optionally, the set of equations represents partial differential equations (PDEs).

Alternatively or additionally, in some implementations, the dynamic analysis optionally includes comparing the at least one attribute of the simulation to a threshold.

Alternatively or additionally, in some implementations, the first and second sets of computing resources are part of a computing cluster.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
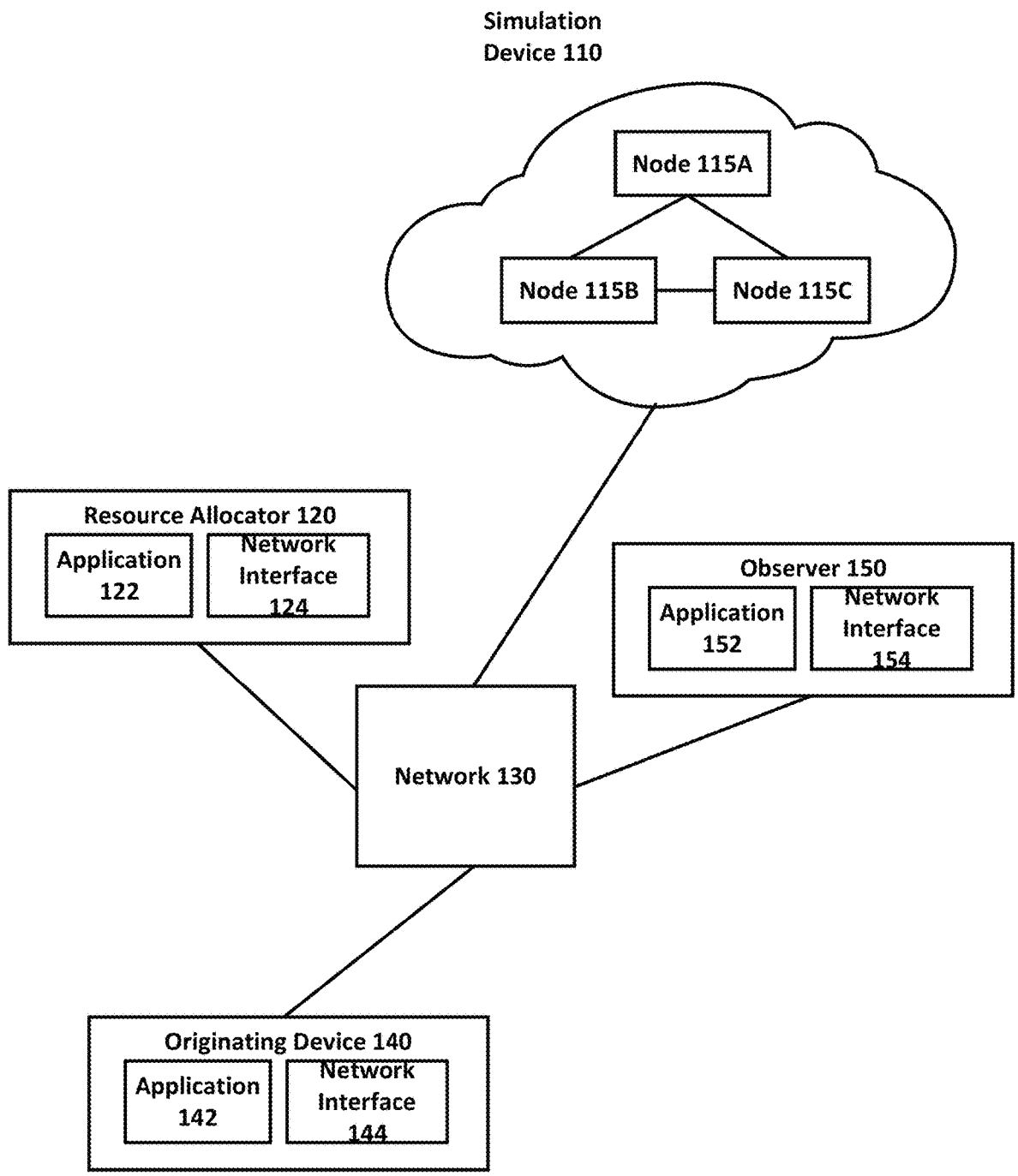
FIG. 1 is a block diagram of an example computing environment according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Described herein are systems and methods for automated resource allocation during a computational simulation (also referred to herein as "numerical simulation" or "simulation"). As described herein, the systems and methods improve the robustness and efficiency of simulation when using parallel computing resources to calculate a solution for a virtual model of a physical object or phenomenon. Using conventional techniques, it is difficult to determine a priori the required set of computing resources for a simulation, and particularly an optimal and/or minimal set of computing resources. In other words, a priori knowledge of the simulation alone may be insufficient to accurately determine the required computing resources for the simulation. Once the simulation is started, additional information, which is unknown at the start, is collected during the simulation. For example, using conventional techniques, a user may estimate that "X" gigabytes (GB) of memory are required for a simulation. The simulation is started with "X" GB of memory available, but due to unknown or unknowable factors at start time, the simulation will actually require more than "X" GB of memory to reach completion. This this will cause the simulation to fail before it is finished. Alternatively, the simulation may actually require less than "X" GB of memory, which needlessly ties up computing resources. Conventional techniques do not automatically detect and respond to such simulation states.

The systems and methods described herein address the problems above, for example by automating resource allocation. For example, the systems and methods described herein improve robustness by avoiding simulation failure due to inadequate resource allocation. By performing a dynamic analysis while the simulation is running, the computing resource determination is updated using a posteriori knowledge of the simulation. As a result, the systems and method described herein are capable of preventing simulation failure before it occurs (i.e., the systems and methods described herein are proactive, not simply reactive to a detected failure). The systems and methods described herein also improve efficiency by correcting over-allocation of computing resources. The systems and methods described herein also account for changes to the required resources during the simulation. These capabilities represent an improvement over manually determining the resource requirements, reallocating resources and restarting a simulation.

Simulation methods include, but are not limited to, FEM and FDM. For example, the concept of finite element analysis (FEA) is generally well-understood in the art and involves the discretization of a virtual model into nodes, each node containing spatial information as well as connection to the surrounding nodes through differential equations (e.g., partial differential equations (PDEs)) that represent the physics being calculated for that node. These nodes, and the differential equations describing them, form a matrix that is representative of the virtual model, and the matrix is transmitted in whole or in part to a processing unit or group of processing units for calculation of a solution at a given time or frequency (or time range or set of frequencies).

Optionally, in an elastic cloud computing system (e.g., the computing environment shown in FIG. 1), the optimal amount of computational resources (e.g. number of computational cores, amount of memory, type of hardware, etc.) can be dynamically determined and chosen to optimally solve either the single simulation or several separate simulations. In a cloud computing environment, the optimal amount of computing resources to assign to a single simulation or a set of simulations can be chosen to optimize based on different criteria, e.g.:

minimize core hour cost;
minimize total simulation time;
maximize packing efficiency for a given hardware configuration; and/or
minimize energy used.

As described below, dynamically changing the resources used for a simulation in a cloud computing environment may include increasing or reducing the resources (cores, RAM, etc.) allocated to a single container or starting a new container of different size and mapping the simulation state from the original container into the new container, where the simulation is either continued or restarted with the new container.

Referring now to FIG. 1, an example computing environment is shown. The methods for dynamic resource allocation for computational simulation described herein can be performed using the computing environment shown in FIG. 1. The environment includes a simulation device 110, a resource allocator 120, an originating device 140, and an observer 150. It should be understood that the environment shown in FIG. 1 is provided only as an example. This disclosure contemplates that the methods for dynamic resource allocation for computational simulation described herein may be performed using a computing environment having more or less components and/or with components arranged differently than shown in FIG. 1. It should be understood that the logical operations described herein can be performed by one or more of the devices shown in FIG. 1, which is provided only as an example computing environment.

The simulation device 110, the resource allocator 120, the originating device 140, and the observer 150 are operably coupled to one or more networks 130. This disclosure contemplates that the networks 130 are any suitable communication network. The networks 130 can be similar to each other in one or more respects. Alternatively or additionally, the networks 130 can be different from each other in one or more respects. The networks 130 can include a local area network (LAN), a wireless local area network (WLAN), a wide area network (WAN), a metropolitan area network (MAN), a virtual private network (VPN), etc., including portions or combinations of any of the above networks. Additionally, each of the simulation device 110, the resource allocator 120, the originating device 140, and the observer 150 are coupled to the one or more networks 130 through one or more communication links. This disclosure contemplates the communication links are any suitable communication link. For example, a communication link may be implemented by any medium that facilitates data exchange including, but not limited to, wired, wireless and optical links. Example communication links include, but are not limited to, a LAN, a WAN, a MAN, Ethernet, the Internet, or any other wired or wireless link such as WiFi, WiMax, 3G, 4G, or 5G.

The simulation device 110 can be a computing cluster, for example, made up of a plurality of nodes 115 (e.g., the nodes 115A, 115b, and 115C). As used herein, a computing cluster is a plurality of inter-connected computing resources that are accessible over a network and have resources (e.g., computing power, data storage, etc.) greater than those found in a typical personal computer. In some implementations, the computing cluster is a cloud-based computing cluster. Cloud-based computing is an on-demand computing environment where tasks are performed by remote resources (e.g., processing units, storage, databases, software, etc.) that are linked to a user (e.g., the originating device 140) through a communication network (e.g., the Internet) or other data transmission medium. Cloud-based computing is well known in the art and is therefore not described in further detail herein. In other implementations, the computing cluster is a local computing cluster (e.g., computing assets linked via a LAN), where resources are linked to a user (e.g., the originating device 140) through a communication network (e.g., the LAN) or other data transmission medium. Each node 115 can be made up of one or more computing devices such as the computing device 600 shown in FIG. 6. It should be understood that the number of nodes 115 (i.e., three) in FIG. 1 is provided for illustrative purposes only. There is no limit to the number of nodes 115 that can be supported by the simulation device 110. The simulation device 110 can be configured to perform the computational simulation (e.g., FEM, FDM, or other computational simulation technique). Example systems and methods for running a simulation using a cloud-based computing cluster are described in U.S. patent application Ser. No. 16/856,222, filed Apr. 23, 2020 by OnScale, Inc., and titled "SYSTEMS AND METHODS FOR RUNNING A SIMULATION."

Figure 6:
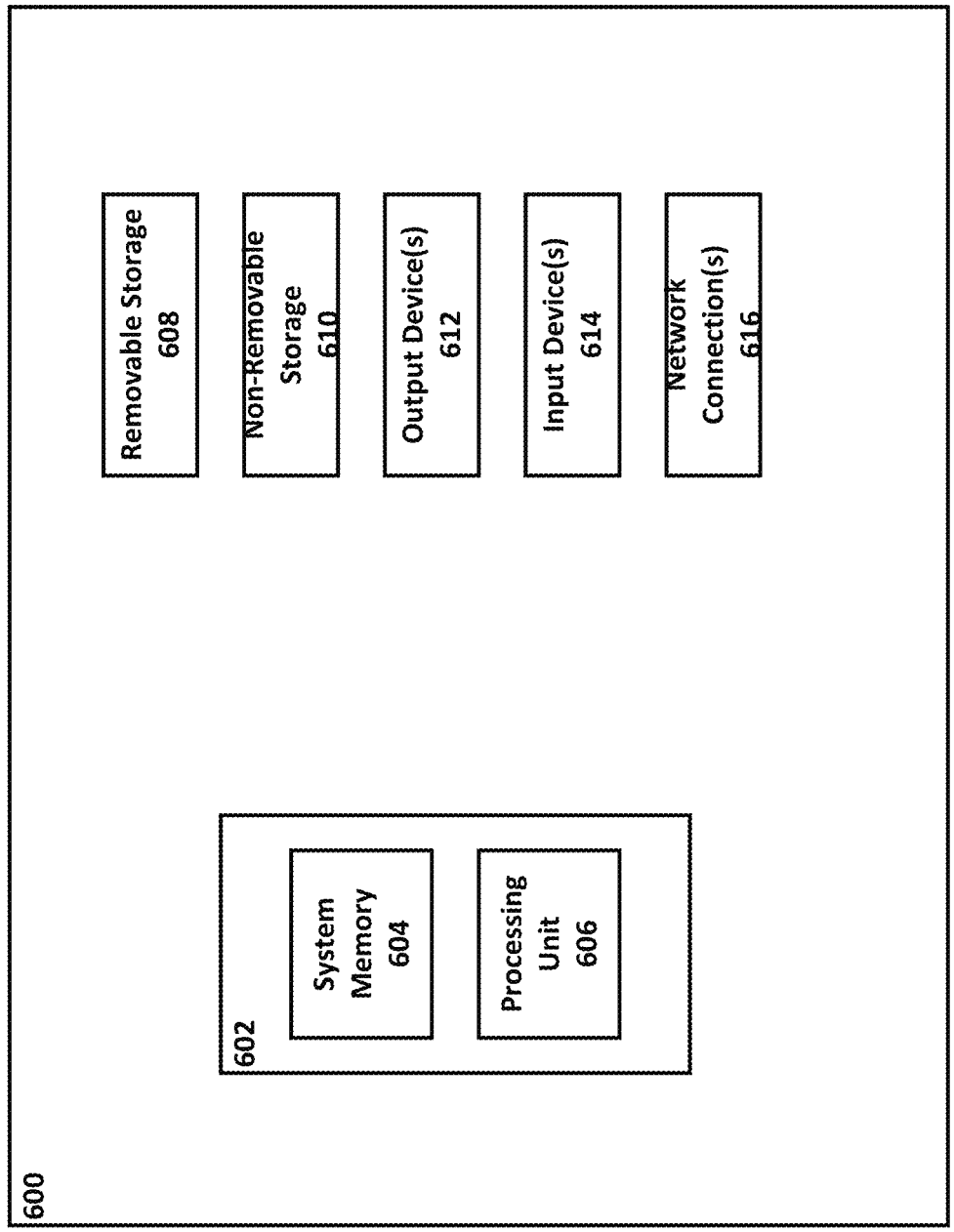
FIG. 6 is a block diagram of an example computing device.

The resource allocator 120 can be a computing device such as the computing device 600 shown in FIG. 6. The resource allocator 120 can be configured to execute an application 122. The application 122 may include instructions for executing one or more of the operations for automated resource allocation for computational simulation as described with regard to FIG. 2. For example, the resource allocator 120 can be configured to receive and/or access information associated with the simulation(s) (e.g., information including, but not limited to, the simulation inputs, simulation attributes, and/or compute capacity indicators described herein), analyze such information associated with the simulation(s), and/or allocate computing resources based on such analysis. Such information associated with the simulation(s) can be received from a monitoring device or process. Optionally, the resource allocator 120 can be configured to monitor information associated with the simulation(s) (e.g., information including, but not limited to, the simulation inputs, simulation attributes, and/or compute capacity indicators described herein). The resource allocator 120 can communicate with the networks 130 through a network interface 124. Optionally, the network interface 124 may encrypt data prior to transmitting such data via the networks 130. This disclosure contemplates that any type of encryption may be used.

The originating device 140 can be a computing device such as the computing device 600 shown in FIG. 6. The originating device 140 may be a computing device associated with a user such as a personal computer, desktop computer, laptop, tablet, etc. The originating device 140 can be configured to execute an application 142. The application 142 may be an engineering application (e.g., CAD application) or any other type of application that incorporates modelling, modelling data, simulations, and/or simulation data. The originating device 140 can request that a computational simulation be performed by the simulation device 110. The originating device 140 can communicate with the networks 130 through a network interface 144. Optionally, the network interface 144 may encrypt data prior to transmitting such data via the networks 130. This disclosure contemplates that any type of encryption may be used.

The observer 150 can be a computing device such as the computing device 600 shown in FIG. 6. The observer 150 can be configured to execute an application 152. The application 152 may include instructions for executing one or more of the operations for automated resource allocation for computational simulation as described with regard to FIG. 2. For example, the observer 150 can be configured to execute a process monitoring application. In other words, the observer 150 can be configured to monitor information associated with the simulation(s) (e.g., information including, but not limited to, the simulation attributes and/or compute capacity indicators described herein). The observer 150 can communicate with the networks 130 through a network interface 154. Optionally, the network interface 154 may encrypt data prior to transmitting such data via the networks 130. This includes, but is not limited to, transmitting monitored information to the resource allocator 120, which can be configured to analyze the monitored information. This disclosure contemplates that any type of encryption may be used.

Figure 2:
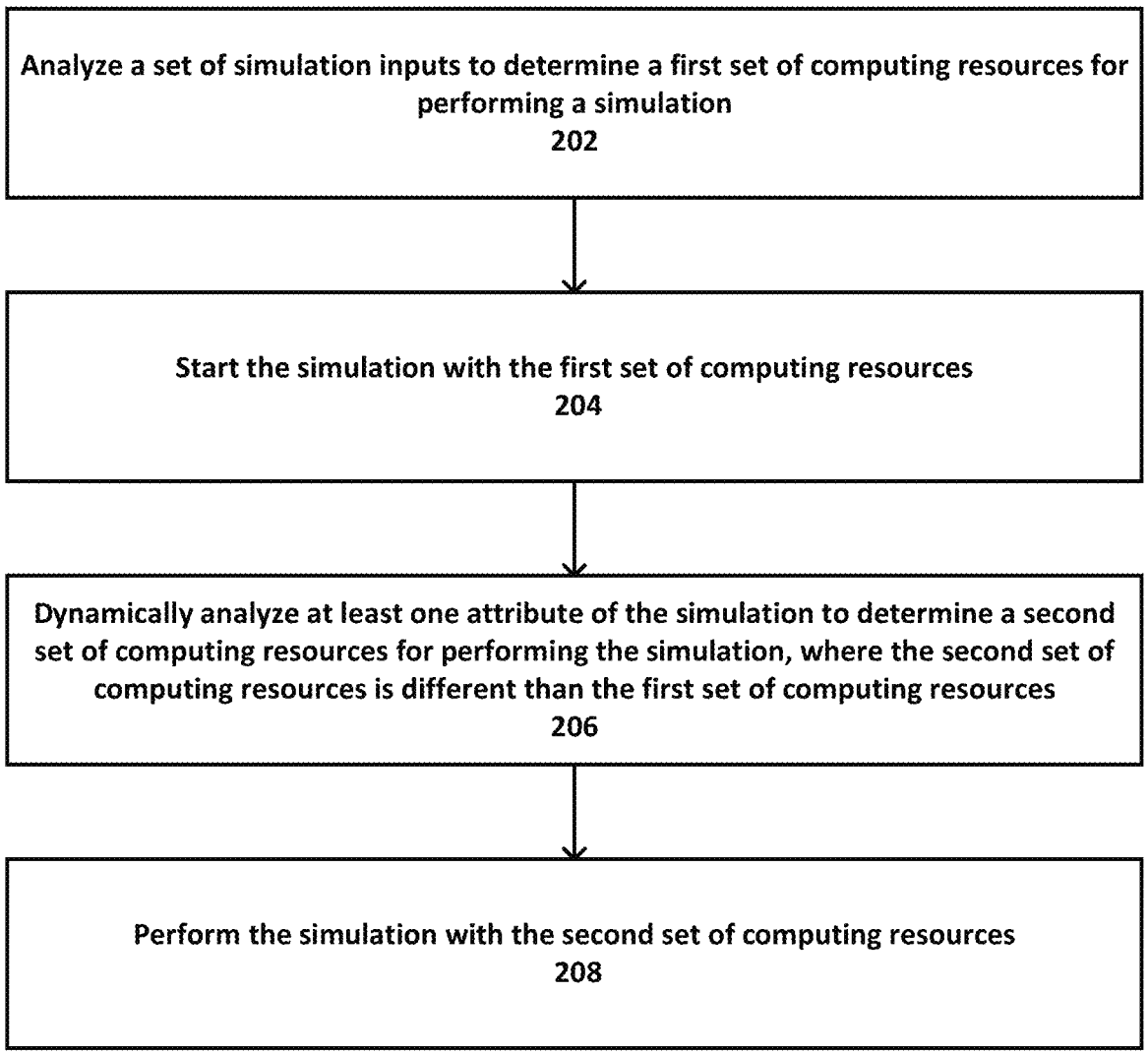
FIG. 2 a flowchart illustrating example operations for automated resource allocation for computational simulation according to an implementation described herein.

Referring now to FIG. 2, a flowchart illustrating example operations for automated resource allocation for computational simulation is shown. The example operations shown in FIG. 2 can be performed in the computing environment shown in FIG. 1. For example, in some implementations, the example operations can be performed by the resource allocator 120 and/or the simulation device 110 shown in FIG. 1. Optionally, in some implementations, the example operations can be performed by the resource allocator 120, the observer 130, and/or the simulation device 110 shown in FIG. 1. As described below, one or more of the operations shown in FIG. 2 can be performed automatically, e.g., without user input and/or intervention. For example, once the simulation begins (e.g., step 204 of FIG. 2), a dynamic analysis is performed (e.g., step 206 of FIG. 2) and the computing resources are adjusted (e.g., step 208 of FIG. 2) in dependence on the results of the dynamic analysis. In other words, no user input or intervention is required to adjust the computing resources. Optionally, in some implementations, all of the operations shown in FIG. 2 can be performed automatically, e.g., without user input and/or intervention.

At step 202, a set of simulation inputs is analyzed to determine a first set of computing resources for performing a simulation. The analysis of step 202 is based on a priori knowledge of the simulation. As described herein, the simulation provides a numerical solution for a simulation model, which is a representation of a physical object. The simulation model is a two-dimensional (2D) model or a three-dimensional (3D) model. For example, the simulation model may be used to simulate various mechanical, thermal, thermomechanical, electromechanical, fluid flow dynamics, and/or magnetomechanical aspects of the physical object. As described herein, the simulation may be performed using the simulation device 110 shown in FIG. 1, which is a computing cluster. Additionally, the simulation is represented by a set of element equations. The element equations may be differential equations such as PDEs. Computation simulation techniques such as FEM and FDM may be used to obtain a numerical solution for a set of differential equations. As used herein, a set of simulation inputs includes one or more simulation inputs. Simulation inputs can include, but are not limited to, geometry representations (e.g., CAD files, image files), material properties (e.g., density, heat capacity, Young's modulus), boundary conditions (e.g., fluid velocity, solid wall of fluid channel, pressure, displacement), loading conditions (e.g., force, pressure, heat flux, temperature), mesh parameters (e.g., mesh cell size, mesh cell element type), solver options (e.g., steady state, transient), output requests and/or time parameters. It should be understood that the simulation inputs (and examples thereof) provided above are only examples. This disclosure contemplates that the simulation inputs analyzed at step 202 may include any information, data, etc. needed and/or desired to run a simulation.

Optionally, in some implementations, respective simulation inputs for each of a plurality of simulations are analyzed at step 202. In these implementations, each of the simulations provides a numerical solution for a respective simulation model, which is represented by a respective set of element equations. For example, the simulation model may optionally be partitioned into multiple windows (e.g., by physics, solve method, and/or time step size), each window being represented by a different set of element equations. In these implementations, the analysis at step 202 can be used to determine a respective set of computing resources for solving a respective simulation to arrive at its numerical solution.

As described above, step 202, which can be performed by the resource allocator 120 shown in FIG. 1, analyzes the simulation inputs to determine a set of computing resources (e.g., a number of cores, amount of RAM, etc.) needed to perform the simulation. It should be understood that the resource allocator 120 shown in FIG. 1 can be configured to receive and/or access the simulation inputs. Optionally, the set of simulation inputs is analyzed to determine the set of computing resources for performing the simulation while achieving a target value for a simulation metric. Optionally, the target value is an optimal value for the simulation metric. In other words, the resource allocator 120 can, in some implementations, determine the set of computing resources needed to optimize the simulation, for example, to minimize one or more of the cost, time, and/or resources used for the simulation. In other implementations, the target value is a desired value for the simulation metric (i.e., not optimal but desired). For example, the user may provide a desired cost limitation and/or desired run time requirement. This disclosure contemplates that a simulation metric can include, but is not limited to, core hour cost, simulation run time, efficiency of hardware configuration, or energy cost. It should be understood that these are only example simulation metrics. This disclosure contemplates determining a set of computing resources needed to achieve a target value for other simulation metrics. Optionally, in some implementations, the objective is to solve multiple sets of element equations in about the same amount of time (e.g., achieve the same or similar simulation run time for multiple simulations). As described herein, the simulation is performed by a computing cluster, and the computing resources for performing the simulation can be assigned and/or adjusted to achieve the simulation metric. This adjustment can occur dynamically, e.g., during the simulation as described below. In other words, the number of processing units and/or memory assigned from the computing cluster can be increased or decreased to achieve the simulation metric.

This disclosure contemplates that the analysis of step 202 of FIG. 2 can be performed using a model for estimating the required computing resources based on one or more known simulation inputs. Such models include, but are not limited to, machine learning models, empirical models, and analytical models. An example method for analyzing a simulation to estimate the computational cost of simulation using machine learning is described in in U.S. Provisional Patent App. No. 62/931,299, filed Nov. 6, 2019 by OnScale, Inc., and titled "METHODS FOR THE ESTIMATION OF THE COMPUTATIONAL COST OF SIMULATION." It should be understood that the machine learning-based method described in U.S. Provisional Patent App. No. 62/931,299 is provided only as an example technique for performing the analysis of step 202 of FIG. 2. This disclosure contemplates using other techniques for analyzing the set of simulation inputs to determine a set of computing resources needed to perform the simulation. For example, empirical, semi-empirical or analytical models can be used to estimate the resources (e.g., cores, memory, time, etc.) needed by an algorithm to solve a given computational problem. This disclosure contemplates using empirical, semi-empirical or analytical models known in the art to estimate the resources. As a non-limiting example, the model may be a best fit regression model. A regression model may be linear or non-linear. An example regression model can estimate computational cost based on the simulation inputs, e.g., the mesh size (e.g., number of cells and/or vertices) and the geometric parameters (e.g., surface-to-volume ratio). It should be understood that the simulation inputs upon which the example regression model is based are provided only as an example.

A set of computing resources can include, but is not limited to, a number of cores, an amount of memory (e.g., RAM), a number of virtual machines, and/or a hardware configuration. For example, the first set of computing resources may be the computing resources of Container A 302 shown in FIG. 3. Container A 302 includes a given number of cores and amount of memory needed to solve a simulation model. This disclosure contemplates that computing resources from the computing cluster shown in FIG. 1 can be used to create Container A 302. Optionally, the first set of computing resources is an optimal set of computing resources for solving the set of element equations to arrive at the numerical solution for the simulation while achieving a target value for a simulation metric (e.g., cost, run time, energy, etc.).

Referring again to FIG. 2, at step 204, the simulation model is started with the first set of computing resources. For example, the first set of computing resources may be the computing resources of Container A 302 shown in FIG. 3. As described herein, the simulation is performed by a computing cluster such as the simulation device 110 shown in FIG. 1. In some implementations, performance of the simulation at step 204 is started automatically, e.g., without user input and/or intervention and in response to completion of step 202. Alternatively, in other implementations, performance of the simulation at step 204 is started manually, e.g., with user input and/or intervention following completion of step 202.

Referring again to FIG. 2, at step 206, at least one attribute of the simulation is dynamically analyzed to determine a second set of computing resources for performing the simulation. The analysis of step 206 can use a posteriori knowledge of the simulation. Additionally, as described herein, the dynamic analysis of step 206 makes the automated process proactive, not reactive. In other words, the objective of step 206 is to dynamically analyze the simulation attribute(s) while the simulation is running and proactively determine a set of computing resources for performing the simulation. This set of computing resources may be more or less than those currently running the simulation. The dynamic analysis of step 206 can therefore be used to make adjustments. It should be understood that the simulation may end up requiring more or less computing resources than determined at step 202. For example, the simulation may be more or less computationally intense than expected. This may not be determined until the simulation is already running. For example, the dynamic analysis at step 206 considers attributes of the simulation, which is running, while the analysis at step 202 considers simulation inputs. In some implementations, a single attribute of the simulation is analyzed at step

206. Alternatively, in other implementations, multiple attributes of the simulation are analyzed at step 206. As used herein, a dynamic analysis is performed during performance of the simulation. For example, the dynamic analysis of step 206 can be performed during performance of the simulation with the first set of computing resources, i.e., while the simulation is running. Dynamic analysis of the attribute(s) of the simulation at step 206 can occur automatically, e.g., without user input and/or intervention and while the simulation is running.

As described above, the dynamic analysis of step 206 can be performed by the resource allocator 120 shown in FIG. 1. It should be understood that the resource allocator 120 shown in FIG. 1 can also be configured to receive, access, and/or monitor the at least one attribute of the simulation. Additionally, as used herein, an attribute of the simulation can include, but is not limited to, simulation requirements (e.g., amount of memory), simulation performance characteristics (e.g., memory or processor usage), and compute capacity indicators. Compute capacity indicators can include, but are not limited to, usage levels of processor capacity, memory bandwidth, network bandwidth, and/or level of network latency and may optionally be related to an expected quality of service. This disclosure contemplates monitoring one or more attributes of the simulation using the computing environment shown in FIG. 1. For example, this disclosure contemplates that the resource allocator 120 and/or the observer 150 shown in FIG. 1 can be configured to monitor attributes of the simulation such as compute capacity indicators, for example, by running a process monitoring application. Process monitoring applications are known in the art and are therefore not described in further detail herein. Alternatively, compute capacity indicators such as usage levels can be monitored by measurements within the simulation program such as through operating system function calls.

Additionally, in some implementations, the dynamic analysis of step 206 includes determining a difference between a required computing resource and an available computing resource. This can be accomplished, for example, by determining a difference between an attribute of the simulation (e.g., a monitored simulation requirement, simulation performance characteristic, or compute capacity indicator), which may represents the required computing resource, and the first set of computing resources, which may represent the available computing resources. If the required computing resources exceed or are less than the available computing resources, then the computing resources (e.g., the first set of computing resources) can be modified accordingly. For example, a number of cores, an amount of memory (e.g., RAM), a number of virtual machines, and/or a hardware configuration can be determined as the second set of computing resources for performing the simulation. Optionally, a number of cores, an amount of memory (e.g., RAM), a number of virtual machines, and/or a hardware configuration can be assigned or removed from the first set of computing resources. In other words, the change (e.g., increase, decrease) in computing resources may be triggered in response to dynamic analysis of the at least one simulation attribute, for example, in order to meet demand and/or respond to existing conditions. Alternatively or additionally, the dynamic analysis of step 206 optionally includes comparing an attribute of the simulation to a threshold. It should be understood that this may not involve determining a difference between required and available computing resources. If the attribute of the simulation exceeds or is less than the threshold, then the computing resources (e.g., the first set of computing resources) can be modified accordingly. Resource modification can occur automatically, e.g., without user input and/or intervention. It should be understood that the attributes of the simulation (and examples thereof) provided above are only examples. This disclosure contemplates that the attributes of the simulation analyzed at step 206 may include any information, data, etc. associated with the running simulation.

The second set of computing resources is different than the first set of computing resources. The second set of computing resources may contain a different number of cores, amount of memory (e.g., RAM), number of virtual machines, and/or a hardware configuration than the first set of computing resources. It should be understood that the first and second set of computing resources may have specific cores, memory, virtual machines, etc. in common. In some implementations, the second set of computing resources is greater than (e.g., more computing power and/or more memory) the first set of computing resources. For example, in some implementations, the dynamic analysis further determines that the simulation requires more computing resources than included in the set of computing resources currently performing the simulation (e.g., the first set of computing resources determined at step 202). In this scenario, the current set of computing resources are insufficient, i.e., the current set of computing resources cannot complete the simulation. Without intervention, the simulation will fail. To avoid this outcome before it occurs, additional computing resources (e.g., the second set of computing resources determined at step 206) can therefore be used to perform the simulation. In other implementations, the second set of computing resources is less than (e.g., less computing power and/or less memory) the first set of computing resources. For example, in some implementations, the dynamic analysis further determines that the simulation requires less computing resources than included in the set of computing resources currently performing the simulation (e.g., the first set of computing resources determined at step 202). In this scenario, the current set of computing resources are sufficient, i.e., the current set of computing resources can complete the simulation, but the current set of resources may be more expensive (e.g., too many, too much computing power and/or memory, too fast, etc.) than desired. Fewer computing resources (e.g., the second set of computing resources determined at step 206) can therefore be used to perform the simulation.

Optionally, the dynamic analysis of the attribute(s) of the simulation determines the set of computing resources for performing the simulation while achieving a target value for a simulation metric. As described above, the target value is optionally an optimal value for the simulation metric. Alternatively, the target value is optionally a desired value for the simulation metric. This disclosure contemplates that a simulation metric can include, but is not limited to, core hour cost, simulation run time, efficiency of hardware configuration, or energy cost. It should be understood that these are only example simulation metrics.

Figure 4:
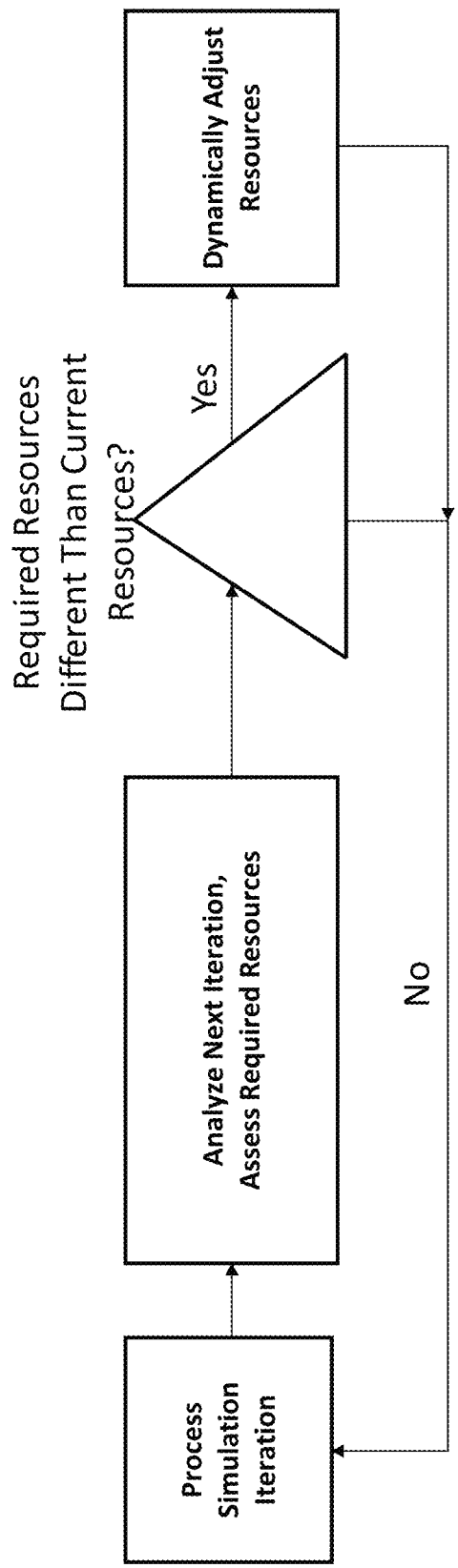
FIG. 4 is a flowchart illustrating example operations for dynamic analysis of the simulation at each iterative time step according to an implementation described herein.

Example analysis methods are described above with regard to step 202. Analysis method include, but are not limited to, machine learning models, empirical models, and analytical models. This disclosure contemplates that the same and/or different analysis methods can be used at step 206. Optionally, in step 206, the analysis method can include the current and historical attributes of the simulation (e.g., a posteriori knowledge of the simulation), which may be in addition to the simulation inputs analyzed at step 202 (e.g., a priori knowledge of the simulation). In other words, the analysis of step 206 can optionally account for data obtained from running the simulation. As described above, the current and historical attributes of the simulation, which are obtained by running the simulation, can provide additional data that may be useful in determining the set of computing resources. Such additional information is unknown before beginning of the simulation. Optionally, the attribute(s) of the simulation are periodically analyzed to determine the second set of computing resources. For example, the dynamic analysis of the attribute(s) of the simulation can be performed between time iterations. Such a process is shown, for example, in the flowchart of FIG. 4. Alternatively, the dynamic analysis of the attribute(s) of the simulation can be performed in the frequency domain or on a quasi-static process.

Figure 3:
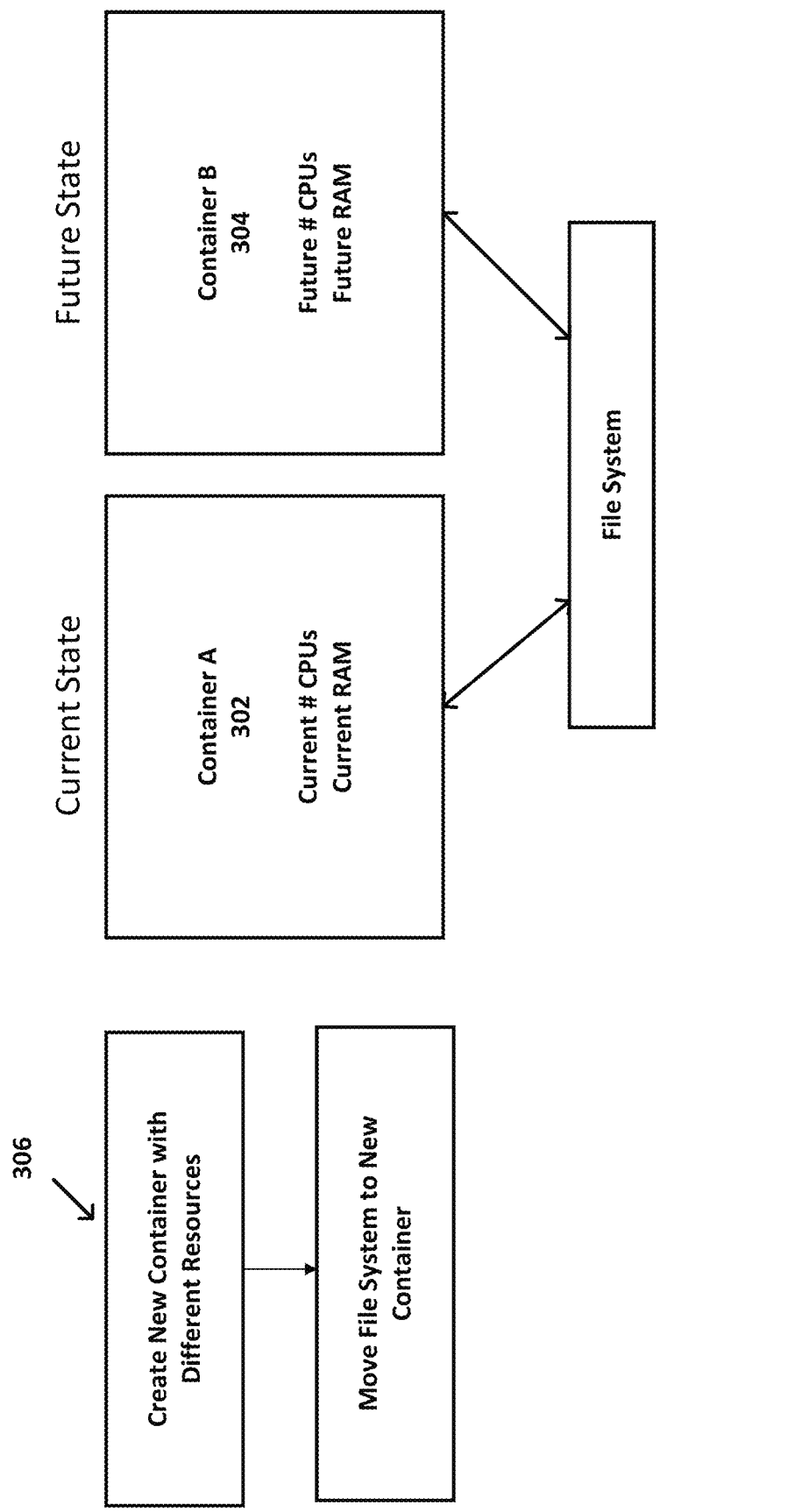
FIG. 3 is a diagram illustrating containerization according to an implementation described herein.

The second set of computing resources may be the computing resources of Container B 304 shown in FIG. 3. Container B 304 includes a given number of cores and amount of memory needed to solve the simulation model. This disclosure contemplates that computing resources from the computing cluster shown in FIG. 1 can be used to create Container B 304. Optionally, the second set of computing resources is an optimal set of computing resources for solving the set of element equations to arrive at the numerical solution for the simulation while achieving a target value for a simulation metric (e.g., cost, run time, energy, etc.).

Referring again to FIG. 3, two different containers—Container A 302 and Container B 304—are shown. Container A 302 may be the first set of computing resources described herein, e.g., the set of computing resources performing the simulation at step 204. This represents the current state of the simulation. Container B 304 may be the second set of computing resources described herein, e.g., the set of computing resources performing the simulation at step 208. This represents the future state of the simulation. As shown by reference number 306 in FIG. 3, a new container (e.g., Container B 304) can be created. This container can include the second set of computing resources described herein, which is different than the first set of computing resources. The simulation state can be transferred from the first set of computing resources (e.g., Container A 302) to the second set of computing resources (e.g., Container B 304) by moving or copying the simulation data from program memory to persistent memory in Container A 302. The persistent memory representation of the simulation data can be connected to or parsed by Container B 304. For example, as shown in FIG. 3, Container A 302 and Container B 304 have access to a file system. The file system is used to temporarily store the contents of Container A 302 until such contents can be transferred to Container B 304. It should be understood that a file system is provided only as an example means for moving or transferring simulation data from Container A 302 to Container B 304. The simulation state can include, but is not limited to, mesh information, constraint and loading conditions, derived quantities, factorized matrices, primary solution and secondary field variables, history variables and stored results.

Referring again to FIG. 2, at step 208, the simulation is performed with the second set of computing resources. For example, the second set of computing resources may be the computing resources of Container B 304 shown in FIG. 3. As described herein, the simulation is performed by a computing cluster such as the simulation device 110 shown in FIG. 1. In some implementations, the simulation is restarted using the second set of computing resources. In other words, the simulation is restarted from the beginning using the second set of computing resources. Alternatively, in other implementations, performance of the simulation is continued using the second set of computing resources. In other words, the simulation is continued beginning at the point where the first set of computing resources stopped the simulation, e.g., the next time iteration or frequency. In either case, the simulation with the first set of computing resources can be terminated in favor of the simulation with the second set of computing resources. Performance of the simulation at step 208 occurs automatically, e.g., without user input and/or intervention and in response to completion of step 206.

Optionally, in some implementations, the mesh is adaptively refined during performance of the simulation. As described herein, the domain of the simulation model is discretized into a finite number of elements (or points, cells) called a mesh. Adaptive refinement of the mesh includes changing a mesh density or an order of mesh elements. Alternatively or additionally, adaptive refinement of the mesh includes changing both the mesh density and the order of mesh elements. Adaptive mesh refinement techniques are known in the art and include, but are not limited to, h-adaptivity, p-adaptivity, and hp-adaptivity. It should be understood that at least one of a domain size, a number of degrees of freedom (DoF), or a constraint condition is changed as a result of the adaptive refinement of the mesh. And as a result, dynamic resource allocation for computational simulation described with regard to FIG. 2 may be advantageous.

Figure 5A:
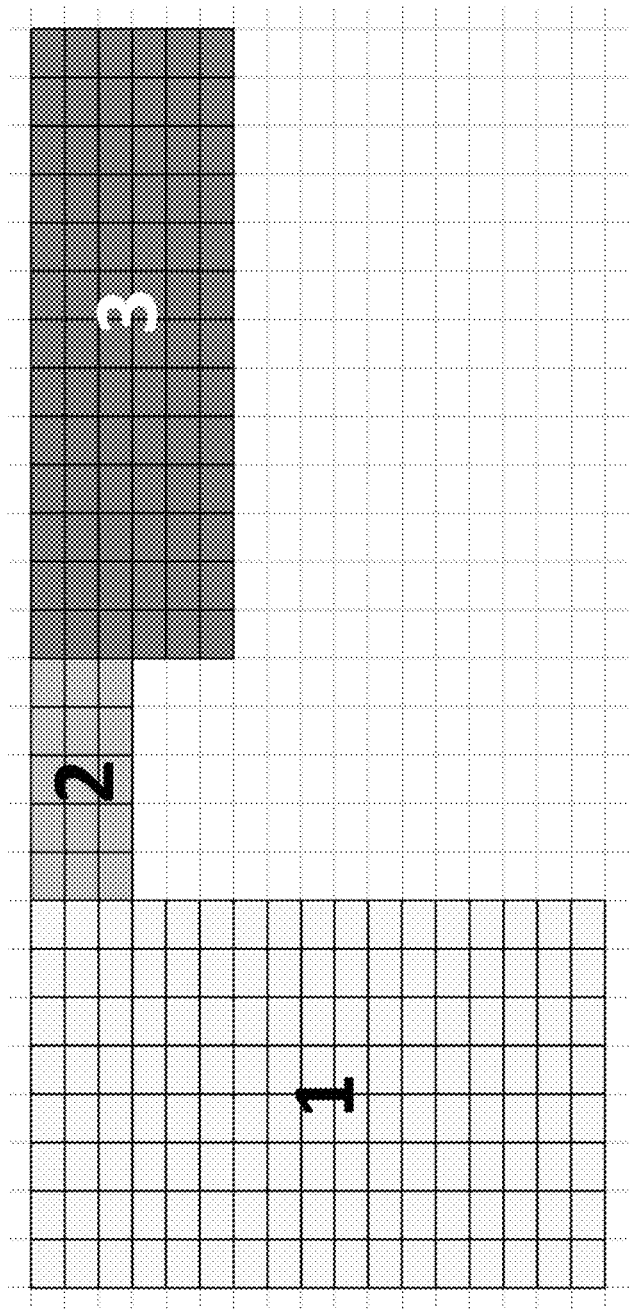
FIG. 5A illustrates an example simulation model where Regions 1, 2, and 3 are meshed with a uniform structured grid.
Figure 5B:
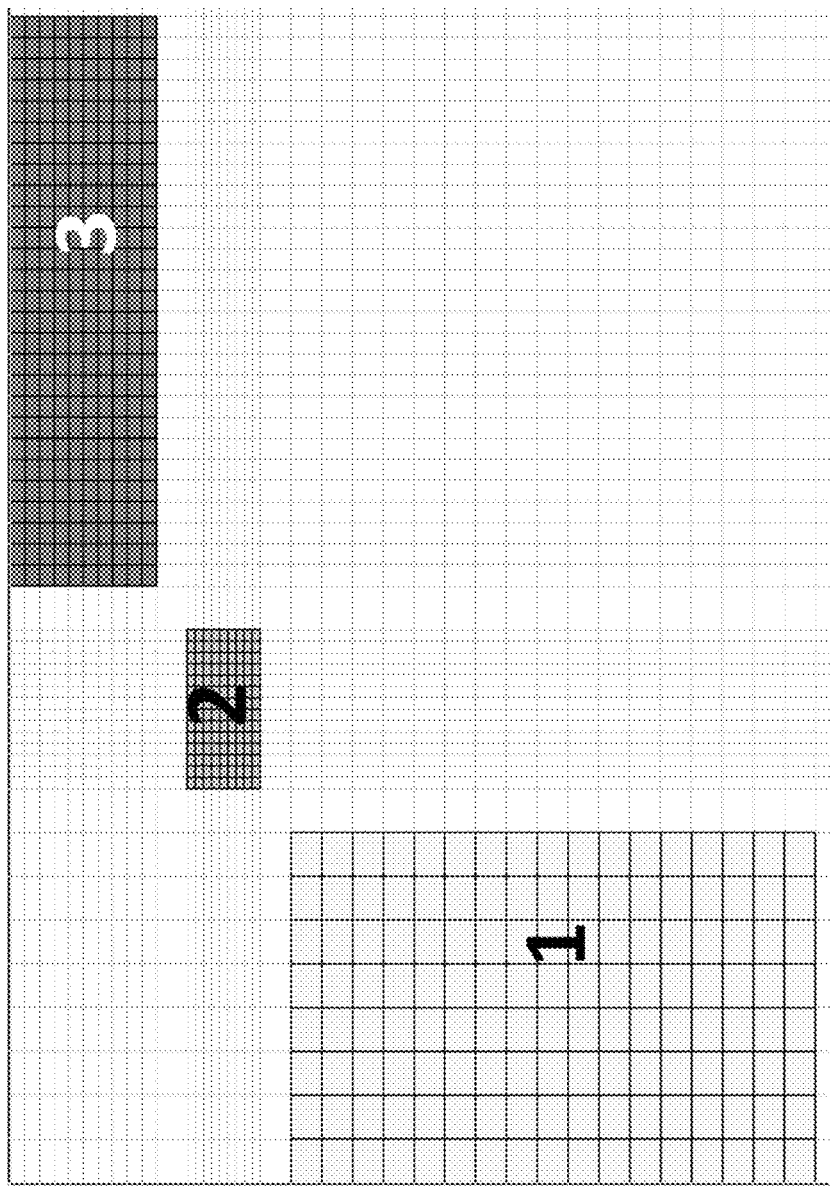
FIG. 5B illustrates an example simulation model where Regions 1, 2, and 3 are meshed with structured grid having different mesh densities.
Figure 5C:
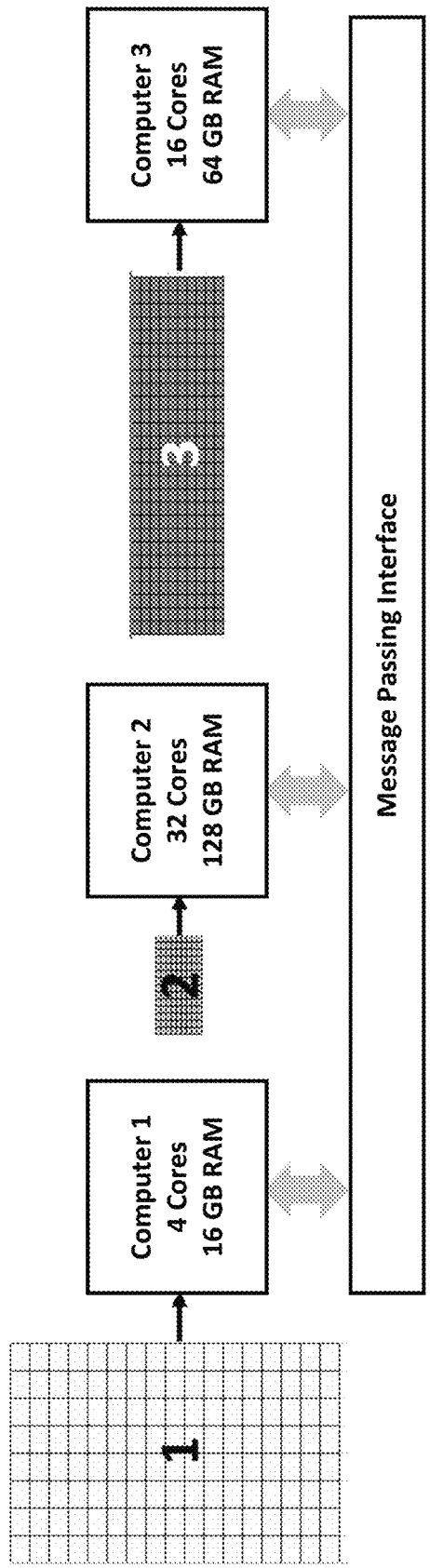
FIG. 5C is a diagram illustrating containerization for solving the simulation model of FIG. 5B.

FIG. 5A illustrates an example where Regions 1, 2, and 3 of a simulation model are meshed with a uniform structured grid. This disclosure contemplates that the simulation model of FIG. 5A can be performed using one or more simulation devices such as simulation device 110 shown in FIG. 1. For example, a uniform structured grid uses a standard cell size and shape (known as a voxel) to allow for efficient indexing of elements in order to reduce the required memory and compute time. This approach is limited, however, in that it complicates spatial refinement of the mesh to improve accuracy and/or necessitates numerical techniques that may themselves be computationally expensive. Accordingly, it may be desirable in some implementations to use different mesh densities for Regions 1, 2, and 3. This is shown, for example, in FIG. 5B, where the simulation model is decomposed into constituent parts and a structured grid mesh with different mesh refinements for each of Regions 1, 2, and 3 is applied. It should be understood that information on the region boundaries can be coupled for the purposes of the simulation. Using the techniques described herein, different containers can be created to perform simulations for Regions 1, 2, and 3 shown in FIG. 5B. This is shown in FIG. 5C, where simulations for Regions 1, 2, and 3 are assigned to Computers 1, 2, and 3, respectively, each of which is made up of different computing resources. The respective containers can be created and assigned based on the analysis to determine a set of computing resources for solving each respective simulation model to arrive at the numerical solution while achieving a simulation metric (e.g., core hour cost, simulation run time, efficiency of hardware configuration, or energy cost). It should be understood that discretizing the simulation model domain spatially as shown in FIGS. 6A-6C is provided only as an example. This disclosure contemplates discretizing the simulation model domain by physics, solve type, time step, etc.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 6, an example computing device 600 upon which the methods described herein may be implemented is illustrated. It should be understood that the example computing device 600 is only one example of a suitable computing environment upon which the methods described herein may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for automated resource allocation during a computational simulation, comprising:
analyzing a set of simulation inputs to determine a first set of computing resources in a computing cluster for performing a simulation, wherein the first set of computing resources is configured to start the simulation;
starting the simulation with the first set of computing resources;
dynamically analyzing at least one attribute of the simulation to determine a second set of computing resources in the computing cluster for performing the simulation, wherein the second set of computing resources is different than the first set of computing resources; and
performing the simulation with the second set of computing resources.

2. The computer-implemented method of claim 1, wherein dynamically analyzing the at least one attribute of the simulation further determines that the simulation requires more computing resources than included in the first set of computing resources.

3. The computer-implemented method of claim 1, wherein the set of simulation inputs comprises at least one of a geometry representation, a material property, a boundary condition, a loading condition, a mesh parameter, a solver option, a simulation output request, or a time parameter.

4. The computer-implemented method of claim 1, wherein the at least one attribute of the simulation comprises a simulation requirement, a simulation performance characteristic, or a compute capacity indicator.

5. The computer-implemented method of claim 1, wherein respective simulation inputs for each of a plurality of simulations are analyzed.

6. The computer-implemented method of claim 1, wherein performing the simulation with the second set of computing resources comprises automatically restarting the simulation with the second set of computing resources.

7. The computer-implemented method of claim 1, wherein performing the simulation with the second set of computing resources comprises automatically continuing the simulation with the second set of computing resources.

8. The computer-implemented method of claim 1, wherein the set of simulation inputs is analyzed to determine the first set of computing resources for performing the simulation while achieving a target value for a simulation metric.

9. The computer-implemented method of claim 1, wherein the at least one attribute of the simulation is dynamically analyzed to determine the second set of computing resources for performing the simulation while achieving a target value for a simulation metric.

10. The computer-implemented method of claim 8, wherein the simulation metric is core hour cost, a memory requirement, simulation run time, efficiency of hardware configuration, or energy cost.

11. The computer-implemented method of claim 1, wherein each of the first and second sets of computing resources comprises at least one of a number of cores, an amount of memory, a number of virtual machines, or a hardware configuration.

12. The computer-implemented method of claim 1, further comprising transferring a state of the simulation from the first set of computing resources to the second set of computing resources.

13. The computer-implemented method of claim 12, wherein the state of the simulation comprises at least one of mesh information, constraint and loading conditions, derived quantities, factorized matrices, primary solution and secondary field variables, history variables, or stored results.

14. The computer-implemented method of claim 1, wherein the at least one attribute of the simulation is periodically analyzed to determine the second set of computing resources for performing the simulation.

15. The computer-implemented method of claim 1, wherein dynamically analyzing at least one attribute of the simulation to determine a second set of computing resources for performing the simulation comprises comparing the at least one attribute of the simulation to a threshold.

16. A system for automated resource allocation during a computational simulation, comprising:
a computing cluster; and
a resource allocator operably coupled to the computing cluster, the resource allocator comprising a processor and a memory operably coupled to the processor, wherein the memory has computer-executable instructions stored thereon that, when executed by the processor, cause the processor to:
analyze a set of simulation inputs to determine a first set of computing resources in the computing cluster for performing a simulation, wherein the first set of computing resources is configured to start the simulation; and
dynamically analyze at least one attribute of the simulation to determine a second set of computing resources in the computing cluster for performing the simulation, wherein the second set of computing resources is different than the first set of computing resources, and wherein the second set of computing resources is configured to perform the simulation.

17. A computer-implemented method for automated resource allocation during a computational simulation, comprising:
receiving a computing environment dataset that describes a plurality of computing environments, wherein each of the plurality of computing environments is associated with a distinct set of computing resources;
analyzing a set of simulation inputs to determine a first computing environment of the plurality of computing environments for performing a simulation;
performing the simulation with the first computing environment;
before completing performance of the simulation with the first computing environment, dynamically analyzing at least one attribute of the simulation to determine a second computing environment of the plurality of computing environments for performing the simulation; and
performing the simulation with the second computing environment.

18. The computer implemented method of claim 17, further comprising ceasing performance of the simulation with the first computing environment before completion as a result of starting performance of the simulation with the second computing environment.

19. The computer implemented method of claim 17, wherein performing the simulation with the first computing environment comprises initiating a first instance of the simulation based on the set of simulation inputs, and performing the simulation with the second computing environment comprises initiating a second instance of the simulation based on the set of simulation inputs.

20. The computer implemented method of claim 17, wherein performing the simulation with the first computing environment comprises initiating a first instance of the simulation based on the set of simulation inputs, and performing the simulation with the second computing environment comprises:
  receiving a simulation state from the first computing environment, wherein the simulation state is based on the first instance's current state; and
  initiating a second instance of the simulation with the second computing environment based on the simulation state.

* * * * *